(12) United States Patent
Decker et al.

(10) Patent No.: US 8,910,515 B1
(45) Date of Patent: Dec. 16, 2014

(54) INSTRUMENTED MAGNETIC PROJECTILE

(75) Inventors: Ryan Decker, Hoboken, NJ (US);
Matthew Ledyard, Hoboken, NJ (US);
Boris Flyash, Wayne, NJ (US); Dominic Cantatore, Hasbrouck Heights, NJ (US);
Michael Hollis, Flanders, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 612 days.

(21) Appl. No.: 13/231,116

(22) Filed: Sep. 13, 2011

(51) Int. Cl.
*G01L 5/14* (2006.01)
*F42B 15/01* (2006.01)
*G01P 3/66* (2006.01)

(52) U.S. Cl.
CPC . *F42B 15/01* (2013.01); *G01P 3/66* (2013.01); *G01L 5/14* (2013.01)

USPC .......................................... 73/167

(58) Field of Classification Search
USPC .......................................... 73/167
See application file for complete search history.

(56) References Cited

U.S. PATENT DOCUMENTS

| | | | | | |
|---|---|---|---|---|---|
| 3,839,962 | A | * | 10/1974 | Popovitch et al. | 102/340 |
| 5,713,239 | A | * | 2/1998 | Kirschner | 73/167 |
| 7,334,466 | B1 | * | 2/2008 | Brislin et al. | 73/167 |
| 7,600,421 | B1 | | 10/2009 | Hollis et al. | |
| H0002265 | H | * | 12/2011 | Fouse et al. | 73/167 |
| 2013/0305819 | A1 | * | 11/2013 | Redler | 73/167 |

* cited by examiner

*Primary Examiner* — Andre Allen
(74) *Attorney, Agent, or Firm* — Michael C. Sachs

(57) ABSTRACT

An instrumented projectile that senses and transmits change (s) in position of a projectile subsystem(s) during an interior ballistic event in real-time.

4 Claims, 6 Drawing Sheets

INSTRUMENTED MAGNETIC PROJECTILE

U.S. GOVERNMENT INTEREST

The inventions described herein may be manufactured, used and licensed by or for the U.S. Government for U.S. Government purposes.

FIELD OF THE DISCLOSURE

This disclosure relates generally to the field of munitions. More particularly, it pertains to an instrumented projectile that measures conditions in a launch tube from which the projectile is launched.

BACKGROUND OF THE DISCLOSURE

Military organizations and weapons systems designers have a continual need for information pertaining to projectiles while they are experiencing the interior ballistic environment of artillery and/or cannons. Knowledge of projectile joint mechanics while experiencing such an environment would be particularly useful.

SUMMARY OF THE DISCLOSURE

An advance in the art is made according to an aspect of the present disclosure directed to an instrumented projectile that senses and transmits change(s) in position of a projectile subsystem during an interior ballistic event in real-time.

Viewed from a first aspect, the present disclosure is directed to an instrumented magnetic projectile which provides real-time information about rotational movement of mated parts comprising the projectile. In preferred embodiments, the instrumented magnetic projectile employs a radial magnet measure system (non-contact rotary encoder) to make such real-time measurements. Advantageously, the mated joint may be threaded, crimped, riveted, welded etc. and the instrumentation sufficiently rugged such that information up to and including joint failure may be obtained.

BRIEF DESCRIPTION OF THE DRAWING

A more complete understanding of the present disclosure may be realized by reference to the accompanying drawings in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

Figure 1:
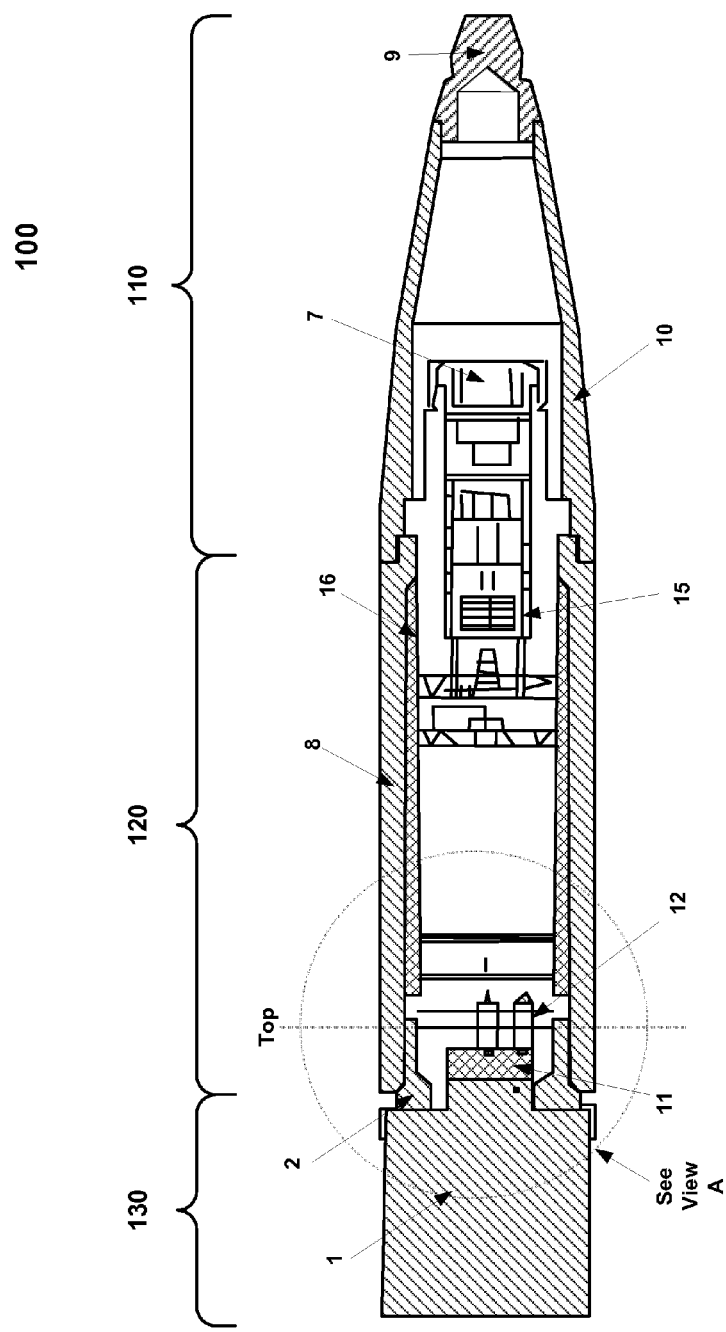
FIG. 1 is a schematic cross-sectional diagram showing an instrumented magnetic projectile according to an aspect of the present disclosure.

With reference now to FIG. 1, there is shown a schematic cross-sectional diagram of an exemplary instrumented magnetic projectile 100 according to an aspect of the present disclosure. As shown, such an exemplary projectile senses and transmits change(s) of position of projectile subsystem(s) in real-time—during internal ballistic event(s). In this exemplary embodiment, data pertaining to mated surfaces (joints) are obtained and transmitted. As previously noted, the joint may advantageously be threaded, crimped, riveted, welded etc such that data up to and including joint failure is obtained. Such an exemplary projectile therefore is capable of withstanding high acceleration and spin(s) that accompany cannon and/or artillery launch event(s).

Briefly, an array of magnets and/or Hall-effect sensors capture angular and axial motion with respect to mating parts (surfaces) of a joint. Signal outputs by the sensors are combined and transmitted at a sufficiently high rate so as to not degrade the signals. The data within the transmitted signals provides a chronological ordering of the launch event and any effects to the joint and mated surfaces. An on-board modularized telemetry system coupled with a receiving antennae positioned near the muzzle exit of the cannon and/or artillery receives the signals transmitted from on-board transmitter(s). Further ground station(s) may collect and/or collate collections of received data.

Returning now to FIG. 1, the principles described above may be viewed in the context of an exemplary structure. More particularly, an instrumented projectile 100 according to an aspect of the present disclosure includes a nose region 110, a body region 120, and a base region 130.

The nose region 110 includes a curved portion (ogive) 10 and a telemetry system 7 positioned therein. Advantageously, the telemetry system may include any of a number of components known to those skilled in the art which exhibit sufficient robustness and speed for the purposes contemplated herein.

As may be appreciated, in order for the telemetry system 7 to transmit collected data, the nose region is capped by a plastic windshield 9. And while we have specified a plastic windshield with respect to this exemplary embodiment, those skilled in the art will appreciate that any material which is sufficiently robust to withstand launch events—while being sufficiently transmissive to signals transmitted by the telemetry system—will suffice for our purposes.

Within the overall body section 120 are shown substantially cylindrical body walls 8 within which are positioned computing/input-output/storage/program/power structures and circuits 15 to process and/or condition data collected from sensors and/or instrumentation. These structures and/or circuits 15 may be electrically and mechanically connected to the telemetry system 7 via wires or other polyimide-based flexible circuits as appropriate. To ensure survivability of these structures within the body section, an encapsulant 16 fills any spaces within the body cavity. Those skilled in the art will appreciate that contemporary electronics offer a number of selectable components/subsystems to provide these structures and as such will be a matter of design choice.

In this exemplary embodiment shown, the base 1 is threadibly attached to a base adapter ring 2 which—in turn—is received into the body wall 8 of overall body section 120. As may be appreciated, this joint is a particularly critical one of the overall projectile and it needs to be monitored during a launch event.

Figure 2:
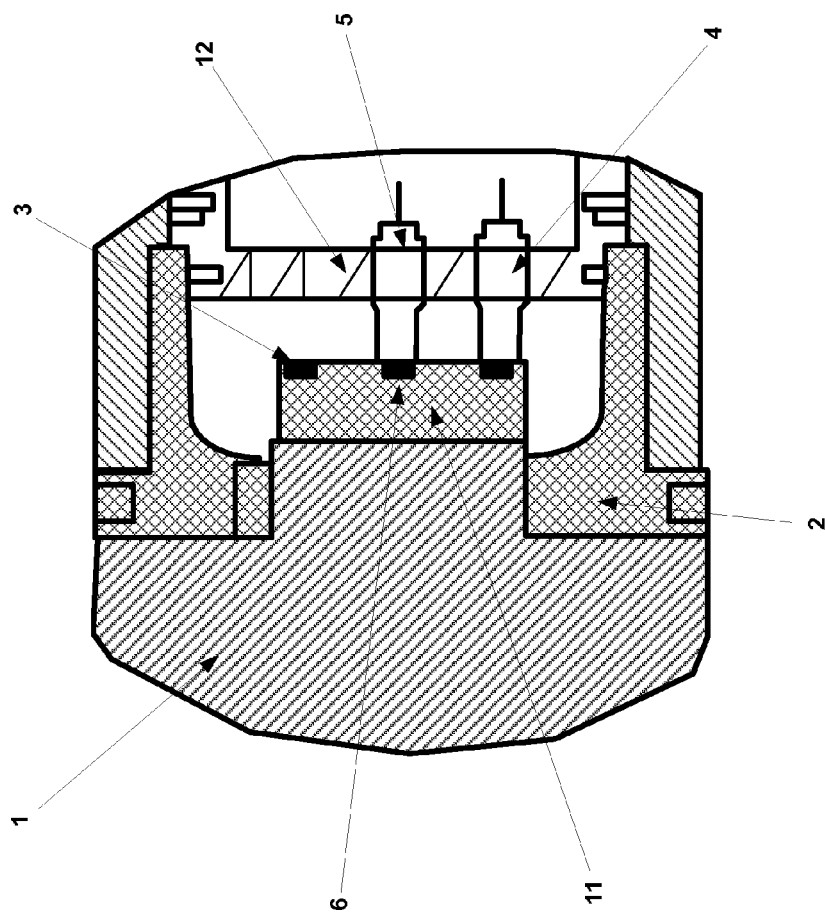
FIG. 2 is a cutaway schematic diagram showing a magnet/sensor array according to an aspect of the present disclosure.

FIG. 2 is a close up view of the cross section of the magnet/sensor array which is positioned at the base/base adapter ring joint. In order to measure any relative axial displacement between the base 1 and the base adapter ring 2, magnets and Hall-effect sensors are employed.

Shown in FIG. 2 is a magnet assembly 11 which is mounted onto the base 1. Substantially at the center of the magnet assembly 11 is a disc magnet 6 which is used to measure the relative axial displacement within this base joint. Also included in this magnet assembly 11 is an array of circumferentially positioned magnets 4 that are used to measure relative rotational displacement within the base/base adapter ring joint.

We note at this time that the magnet assembly structure shown schematically in FIG. 2 which provides the radial magnetic measurement system according to an aspect of the present disclosure may be conveniently called a non-contact rotary encoder as it performs a similar function. That is to say, the magnet assembly structure shown (non-contact rotary encoder) precisely measures relative angular position.

To monitor axial movement of the base 1 relative to the rest of the projectile, sensor assembly 12 is fixed to the base adaptor 2. This sensor assembly 12 includes—in a preferred embodiment—an analog Hall-effect sensor 5—positioned at the center of the assembly 12 such that it remains in alignment with the disc magnet 6. Should the joint separate axially, the Hall-effect sensor 5 detects that the disc magnet 6 is moving farther away and therefore outputs a lower value signal than would be normally output if the magnet were not moving away. These signal output effects are illustrated by the output of the axial sensor (magnet/sensor array) in FIGS. 4, 5, and 6.

Figure 3:
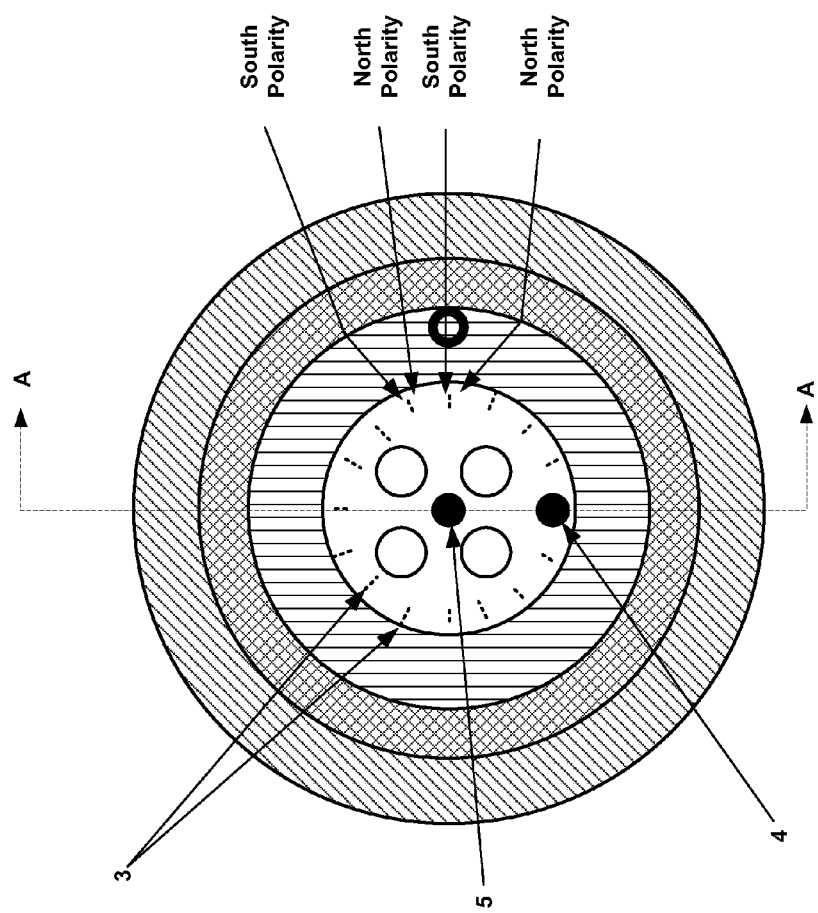
FIG. 3 is a schematic diagram showing a top cross-sectional view of a magnet sensor array according to an aspect of the present disclosure.

As shown in FIG. 3, the sensor assembly includes another analog radial Hall-effect sensor 4 positioned at substantially the same radial distance from the center as the ring of radial magnets 3. As shown in this exemplary FIG. 3, each of the radial magnets 3 is positioned such that their North polarity is always oriented toward the clockwise rotational side. As a relative rotation occurs within the joint, the position of the radial Hall-effect sensor 4 will change with respect to the nearest radial magnet. If—for example—its initial position is above the south polarity (counter-clockwise side) of the magnet, it will output the presence of a south Gaussian field. Consequently, if counter-clockwise rotation occurs, there will be a sharp drop in the sensor output as the sensor moves over the North polarity of the same radial magnet (see FIG. 4). If, on the other hand a clockwise rotation occurs, the drop in sensor output would be more gradual as the sensor moves to the North polarity of the next magnet in sequence (See FIG. 5).

It is noteworthy that while we have shown an exemplary configuration of North/South polarities in the figures, those skilled in the art will appreciate that our teachings according to the present disclosure are not so limited. More particularly, the assembly structure(s) contemplated will operate whether or not the magnets are positioned all north to south or all south to north, while the signals shown for Hall-effect sensor #1 in FIGS. 4, 5 will be negated.

Generally speaking, if the relative rotation (either clockwise or counter-clockwise) occurs at a constant or nearly constant angular velocity, the sensor output data shows which way the rotation occurred. For example—with reference to FIG. 4, if a steep drop in output occurs after a beak reading followed by a gradual rise up to a next peak, then counter-clockwise rotation occurred. Similarly, if a gradual drop occurs after a peak followed by a sharp rise in the output up to a next peak, the clockwise rotation has occurred.

Notably, a minimum angle of rotation is necessary for these determinations to be precisely made. In the exemplary projectile shown, there are 16 radial magnets 3—meaning that a minimum of 22.5 degrees of rotation is required to produce a full peak to peak output. By counting the number of peaks therefore, and measuring the time between them, a total angular displacement and average angular velocity may be determined.

In the event that little or no relative rotation occurs, but the central sensor produces a decaying signal, that would indicate that the threading (or other securing mechanism) has "stripped" from the base and has been axially displaced completely. Such behavior is show in FIG. 6.

Figure 4:
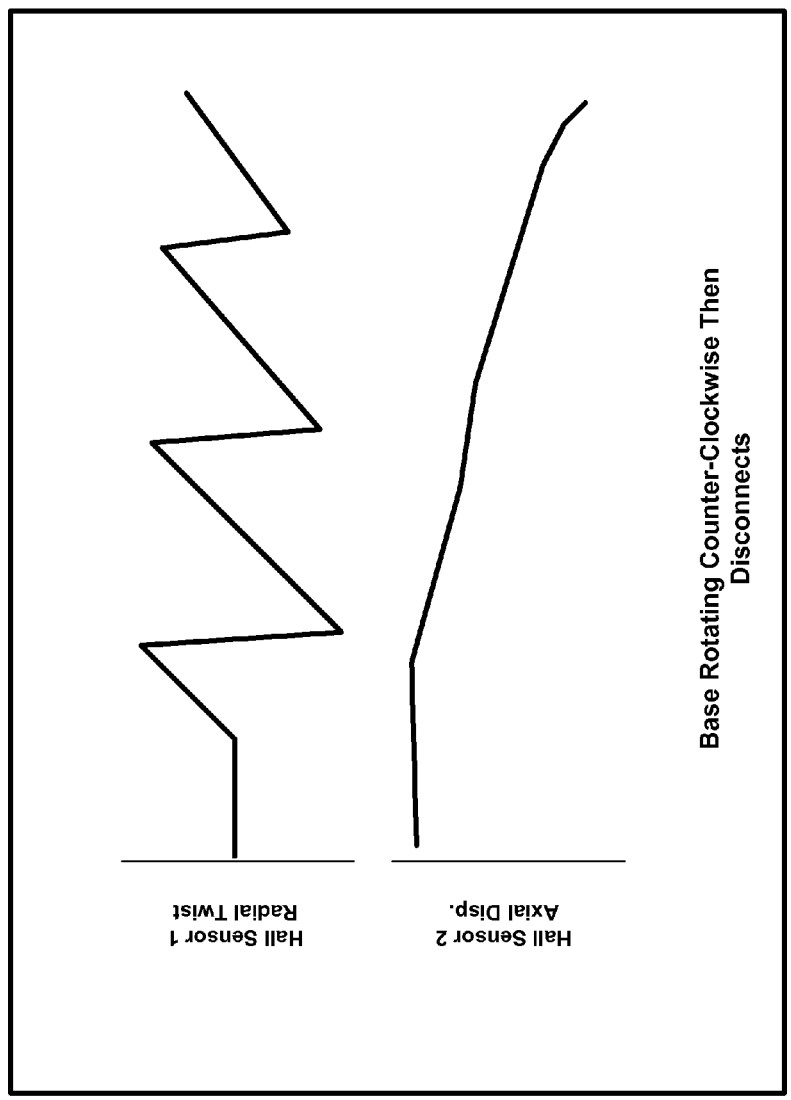
FIG. 4 is a schematic diagram showing sensor output of a magnet/sensor array during counter-clockwise rotation according to an aspect of the present disclosure.
Figure 5:
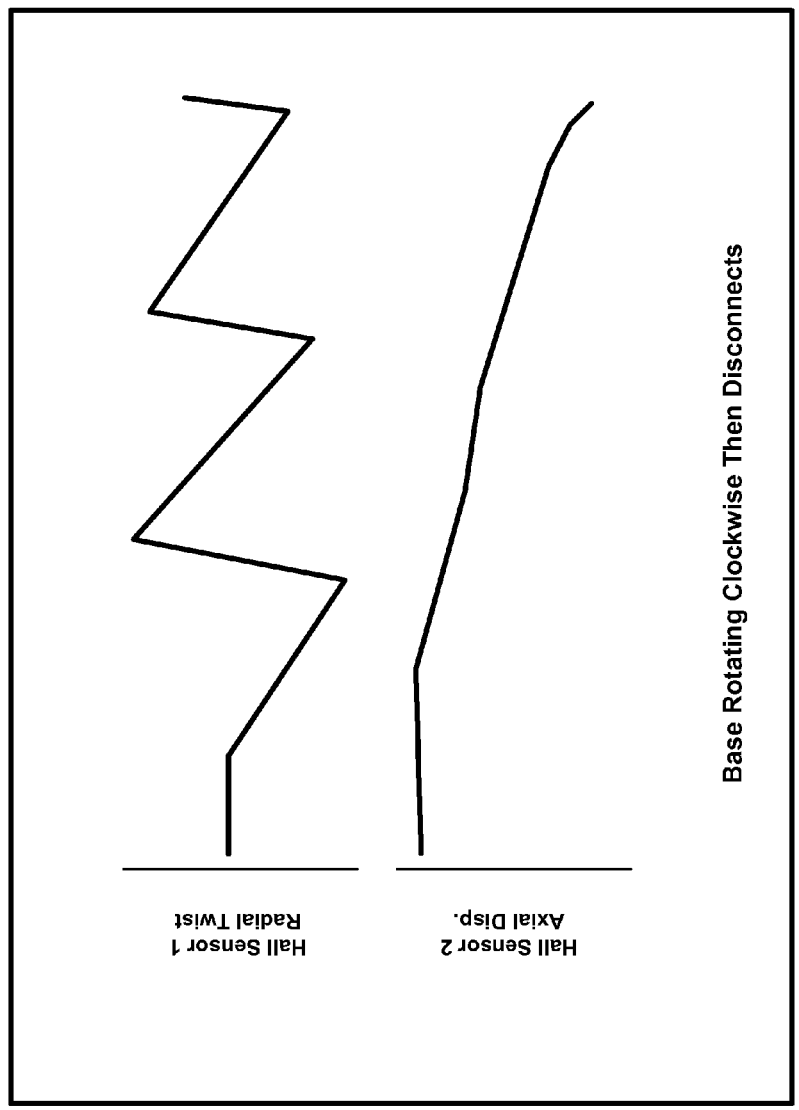
FIG. 5 is a graph showing sensor output of a magnet/sensor array during clockwise rotation according to an aspect of the present disclosure.
Figure 6:
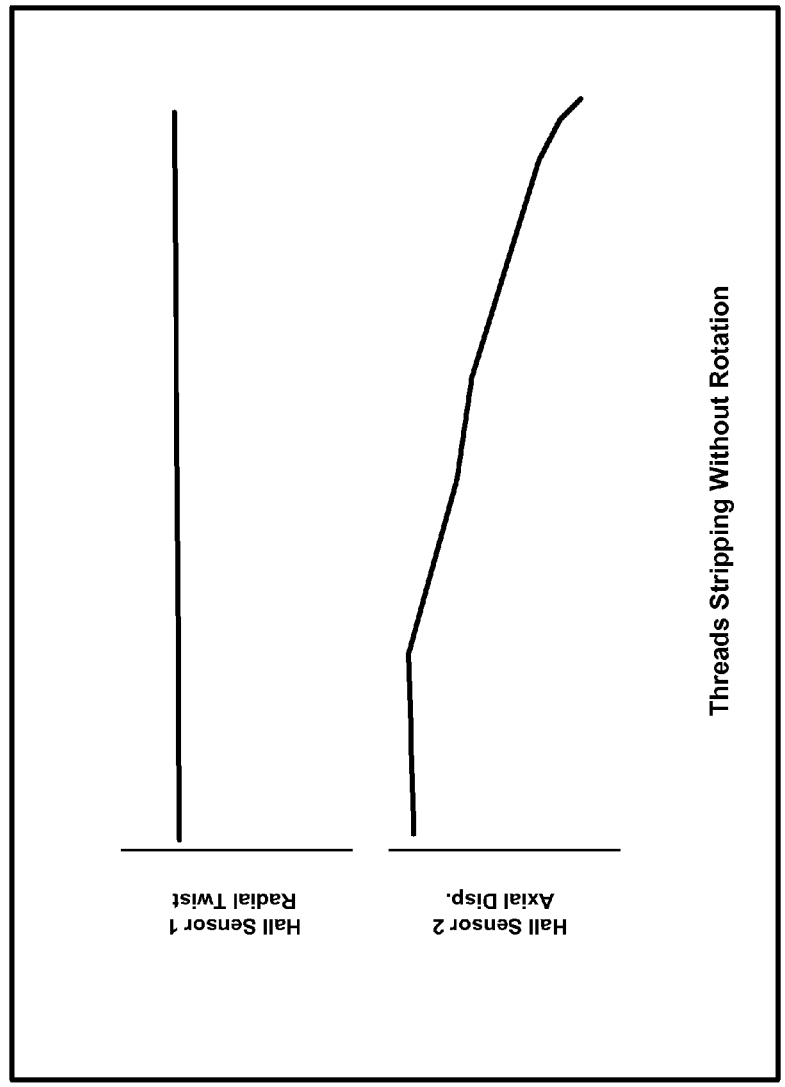
FIG. 6 is a graph showing sensor output of a magnet/sensor array during axial displacement only according to an aspect of the present disclosure.

A further understanding of the characteristics of this output may be gained with reference to FIGS. 4, 5, and 6. For example, with reference to FIG. 4, there is shown the axial and radial sensor output of the respective magnet/sensor array during a counter clockwise rotation followed by a disconnect (the magnet/sensor array being axially displaced from one another). As shown in FIG. 4, an output signal exhibiting a sawtooth pattern having a positive intermediate slope is produced by a radial sensor undergoing a counter-clockwise rotation. The axial magnet/sensor are axially displaced to the point of disconnect, and therefore a gradual falling off signal is produced from that sensor as shown.

Similarly, with reference to FIG. 5, there is shown the sensor output of the axial and radial sensor arrays during a clockwise rotation followed by a disconnect. As shown in FIG. 5, an output signal exhibiting a sawtooth pattern having a negative intermediate slope is produced by a radial sensor undergoing a clockwise rotation. The axial magnet/sensor are axially displaced to the point of disconnect, and therefore a gradual falling off signal is produced.

Finally, FIG. 6 shows a representative sensor output of the magnet/sensor array during an axial displacement only. As may be observed, such an axial displacement produces a signal which gradually falls off as the magnet/sensor array are displaced from one another axially.

Consequently, and as may be appreciated by those skilled in the art, such signals provide valuable data and information concerning the rotational and axial forces on a projectile during a launch event. Comparing the output voltage to a calibrated output data for the same sensor and sized magnet, it is therefore possible to determine the distance between the sensor and the magnet throughout the period of data collection during the launch event.

At this point, while we have discussed and described exemplary embodiments and configurations of the instrumented projectile, those skilled in the art will appreciate that a number of variations to those described are possible and contemplated. Accordingly, the disclosure should be viewed as limited only by the scope of the claims that follow.

The invention claimed is:

1. An instrumented projectile comprising:
   a plurality of sections, each connected to one another via a joint;
   a non-contact rotary encoder system positioned at one or more of the joints for measuring real-time rotation of the joint at which it is positioned during a projectile launch event; and
   an electronics system disposed within the body for collecting data produced by the measurement system.

2. The instrumented projectile according to claim 1 wherein the electronics system comprises a battery, a signal conditioner, a multiplexer and accelerometer and a transmitter.

3. The instrumented projectile according to claim 2 wherein the measurement system is configured to withstand 20,000 Gs of force such as that experienced during a launch event.

4. The instrumented projectile according to claim 1 wherein said non-contact rotary encoder system comprises a radial magnet measurement system including one or more Hall-effect sensors.

* * * * *